United States Patent
Zhao et al.

(10) Patent No.: US 9,541,782 B2
(45) Date of Patent: Jan. 10, 2017

(54) LIQUID CRYSTAL DISPLAY AND ELECTRONIC DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Hebin Zhao, Beijing (CN); Honglin Zhang, Beijing (CN); Dan Wang, Beijing (CN); Xibin Shao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 191 days.

(21) Appl. No.: 14/367,033

(22) PCT Filed: Jul. 1, 2013

(86) PCT No.: PCT/CN2013/078590
§ 371 (c)(1),
(2) Date: Jun. 19, 2014

(87) PCT Pub. No.: WO2014/153890
PCT Pub. Date: Oct. 2, 2014

(65) Prior Publication Data
US 2015/0009444 A1    Jan. 8, 2015

(30) Foreign Application Priority Data
Mar. 27, 2013 (CN) .......................... 2013 1 0102305

(51) Int. Cl.
*G02F 1/136* (2006.01)
*G02F 1/1333* (2006.01)
(Continued)

(52) U.S. Cl.
CPC ....... *G02F 1/133308* (2013.01); *G02F 1/1368* (2013.01); *G02F 1/13363* (2013.01);
(Continued)

(58) Field of Classification Search
CPC ................... G02F 1/133308; G02F 1/133514; G02F 1/133528
(Continued)

(56) References Cited

U.S. PATENT DOCUMENTS 5,532,852 A * 7/1996 Kalmanash ........... G02F 1/1393
349/117
6,456,353 B1 * 9/2002 Chen .................. G02F 1/13452
349/149

(Continued)

FOREIGN PATENT DOCUMENTS

CN    102692736 A    9/2012
JP    10206828 A    8/1998

OTHER PUBLICATIONS

International Preliminary Report on Patentability issued Sep. 29, 2015; PCT/CN2013/078590.

(Continued)

*Primary Examiner* — Lucy Chien
(74) *Attorney, Agent, or Firm* — Ladas & Parry LLP

(57) ABSTRACT

A liquid crystal display is provided. The liquid crystal display includes a position limiting structure, and further includes a TFT substrate, a CF substrate adhered to an internal surface of the TFT substrate, and an adhesive layer disposed at partial or entire area except a specific area on the internal surface of the TFT substrate. The TFT substrate is fixed on the position limiting structure through the adhesive layer. The internal surface of the CF substrate is adhered to the internal surface of the TFT substrate. The specific area on the internal surface of the TFT substrate includes an (Continued)

overlapped area of the internal surface of the TFT substrate and the internal surface of the CF substrate and an area, for connecting a flexible circuit board, on the internal surface of the TFT substrate.

19 Claims, 6 Drawing Sheets

(51) Int. Cl.
    *G02F 1/1335*     (2006.01)
    *G02F 1/13363*     (2006.01)
    *G02F 1/1362*     (2006.01)
    *G02F 1/1368*     (2006.01)
    *G02F 1/1345*     (2006.01)

(52) U.S. Cl.
    CPC .. G02F 1/133514 (2013.01); G02F 1/133528 (2013.01); G02F 1/136209 (2013.01); *G02F 1/13454* (2013.01); *G02F 2001/13356* (2013.01); *G02F 2001/133317* (2013.01); *G02F 2001/133325* (2013.01); *G02F 2001/133531* (2013.01); *G02F 2001/133638* (2013.01); *G02F 2001/136222* (2013.01)

(58) Field of Classification Search
    USPC .......................................................... 349/43
    See application file for complete search history.

(56) References Cited

U.S. PATENT DOCUMENTS 6,461,775 B1 * 10/2002 Pokorny ................ B41M 5/265
                                            349/110
2001/0010569 A1 * 8/2001 Jin ..................... G02F 1/133308
                                              349/58

OTHER PUBLICATIONS

International Search Report Appln. No. PCT/CN2013/0078590; Dated Jan. 9, 2014.
Third Chinese Office Action Appln. No. 201310102305.9; Dated Nov. 18, 2015.
First Chinese Office Action dated Dec. 31, 2014; Appln. No. 201310102305.9.
Second Chinese Office Action Appln. No. 201310102305.9; Dated Jun. 4, 2015.

* cited by examiner

LIQUID CRYSTAL DISPLAY AND ELECTRONIC DEVICE

TECHNICAL FIELD

Embodiments of the present invention relate to a liquid crystal display (LCD) and an electronic device.

BACKGROUND

LCD is a thin and flat display device and is rapidly popularized and developed due to the characteristics of thin body, low power consumption, low radiation, soft in image color and the like.

In order to improve the display area of the LCD with the same display screen size, the narrow border design of the LCD has become a development trend. But the narrow border design of the LCD cannot be actually achieved at present, namely there is no borderless LCD at present.

SUMMARY

Embodiments of the present invention provide an LCD and an electronic device, in which a borderless LCD is provided to maximally increase the display area.

An embodiment of the present invention provides an LCD, which comprises a position limiting structure and further comprises a thin-film transistor (TFT) substrate, a color filter (CF) substrate adhered to an internal surface of the TFT substrate and an adhesive layer disposed at partial or entire area except a specific area on the internal surface of the TFT substrate; the TFT substrate is fixed on the position limiting structure; wherein an internal surface of the CF substrate is adhered to the internal surface of the TFT substrate, and the specific area on the internal surface of the TFT substrate comprises an overlapped area of the internal surface of the TFT substrate and the internal surface of the CF substrate and an area, for connecting a flexible circuit board, on the internal surface of the TFT substrate.

As an example, the LCD further comprises a first polarizer and a second polarizer; the first polarizer is disposed on an external surface of the TFT substrate; the second polarizer is disposed on an external surface of the CF substrate; the first polarizer is a vertical polarizer and the second polarizer is a horizontal polarizer, or the first polarizer is a horizontal polarizer and the second polarizer is a vertical polarizer; the external surface of the TFT substrate is another surface opposite to the internal surface of the TFT substrate, and the external surface of the CF substrate is another surface of the CF substrate, opposite to the internal surface of the CF substrate.

As an example, the LCD further comprises a first phase retardation film and a second phase retardation film; the first phase retardation film is disposed between the first polarizer and the TFT substrate; the second phase retardation film is disposed between the second polarizer and the CF substrate; and the first phase retardation film and the second phase retardation film achieve opposite phase retardation.

As an example, the first phase retardation film is a $-\lambda/4$ phase retardation film and the second phase retardation film is a $\lambda/4$ phase retardation film, or the first phase retardation film is a $\lambda/4$ phase retardation film and the second phase retardation film is a $-\lambda/4$ phase retardation film.

As an example, a black light-shielding layer is further disposed on the TFT substrate and configured to avoid reflection of incident ambient light.

As an example, the black light-shielding layer is a black resin layer.

As an example, the position limiting structure is disposed at an area, except the overlapped area of the internal surface of the TFT substrate and the internal surface of the CF substrate, on the internal surface of the TFT substrate and also disposed at partial or entire peripheral area on the second polarizer, and the position limiting structure is configured to support the TFT substrate and fix the CF substrate between the TFT substrate and the position limiting structure.

As an example, the internal surface of the TFT substrate covers whole of the internal surface of the CF substrate.

As an example, the LCD further comprises a light source and an optical film which are fixed on the position limiting structure.

Another embodiment of the present invention provides an electronic device, which comprises the foregoing LCD.

The borderless design of the LCD is achieved by fixing the TFT substrate on the position limiting structure through the adhesive layer by utilization of the area, not overlapped with the CF substrate and not provided with the flexible circuit board, on the internal surface of the TFT substrate.

DETAILED DESCRIPTION

Figure 1:
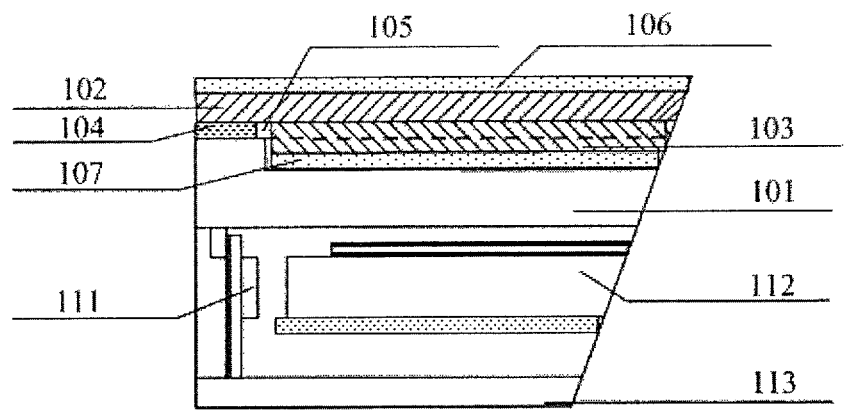
FIG. 1 is a schematic structural partial view of an LCD in accordance with an embodiment of the present invention.

The LCD provided by the embodiment of the present invention comprises a position limiting structure, and further comprises a TFT substrate, a CF (color filter) substrate adhered to an internal surface of the TFT substrate and an adhesive layer disposed at partial or entire area except a specific area on the internal surface of the TFT substrate. The TFT substrate is fixed on the position limiting structure through the adhesive layer. An internal surface of the CF substrate is adhered to the internal surface of the TFT substrate. The specific area on the internal surface of the TFT substrate comprises an overlapped area of the internal surface of the TFT substrate and the internal surface of the CF substrate, and an area, for connecting a flexible circuit board, on the internal surface of the TFT substrate.

It should be noted that the internal surface of the TFT substrate refers to a surface of the TFT substrate, facing to the CF substrate; and similarly, the internal surface of the CF substrate refers to a surface of the CF substrate, facing to the TFT substrate, namely the internal surface of the TFT substrate faces to the internal surface of the CF substrate. Both the internal surface of the TFT substrate and the internal surface of the CF substrate are divided into a display area and a non-display area. TFT arrays for controlling different pixels are disposed at the display area of the TFT substrate; and color filters corresponding to different pixels are disposed at the display area of the CF substrate. "The CF substrate adhered to the internal surface of the TFT substrate" refers to that: the TFT substrate and the CF substrate are firmly adhered to each other by coating a sealant on non-display areas on the periphery of facing area of the internal surface of the TFT substrate and the internal surface of the CF substrate, and liquid crystals are injected into a sealed space between the TFT substrate and the CF substrate to form a liquid crystal cell.

As the non-display area of a general TFT substrate always comprises a connecting area for a flexible circuit board which is configured to drive pixels to display, the area of the TFT substrate is greater than that of the CF substrate. By utilization of the area, not overlapped with the CF substrate and not provided with a flexible circuit board, on the internal surface of the TFT substrate, the TFT substrate is fixed on the position limiting structure through the adhesive layer and the CF substrate is disposed between the TFT substrate and the position limiting structure. Compared with a known display device in which the position limiting structure is disposed on the periphery of the TFT substrate, the embodiment of the present invention can achieve the borderless design of the LCD.

It should be noted that the position limiting structure in the embodiment of the present invention may be a frame, a back plate or an integral structure formed by the frame and the back plate, and not only configured to fix the TFT substrate, the CF substrate and films and structures disposed thereon but also configured to fix structures such as a light source and an optical film as for the case that the LCD further comprises the light source and the optical film. No limitation will be given in the present invention. The position limiting structure provided by the embodiment of the present invention may be any structure for limiting components of the LCD at fixed positions and achieving tight and firm assembly. Description will be given to the following embodiments by taking the case that the position limiting structure adopts the frame as an example.

Further detailed description will be given below to the embodiments of the present invention with reference to the accompanying drawings.

As illustrated in FIG. 1, the LCD provided by the embodiment of the present invention comprises a frame 101, and further comprises a TFT substrate 102, a CF substrate 103 adhered to an internal surface of the TFT substrate 102, and an adhesive layer 104 disposed at partial or entire area except a specific area on the internal surface of the TFT substrate 102. The TFT substrate 102 is fixed on the frame 101 through the adhesive layer 104. An internal surface of the CF substrate 103 is adhered to the internal surface of the TFT substrate 102. The specific area on the internal surface of the TFT substrate 102 comprises an overlapped area of the internal surface of the TFT substrate 102 and the internal surface of the CF substrate 103, and an area 105, for connecting a flexible circuit board, on the internal surface of the TFT substrate 102.

It should be noted that FIG. 1 is a partial top view of a borderless LCD provided by the embodiment of the present invention.

In the embodiment, as the TFT substrate 102 adhered with the CF substrate 103 is fixed on the frame 101 through the adhesive layer 104, an area, not adhered with the CF substrate, on the TFT substrate is fixed with the frame, so that the case that the frame is disposed on the periphery of the TFT substrate to form a border of the LCD can be avoided, and hence the borderless design of the LCD is achieved.

For instance, the internal surface of the TFT substrate 102 completely covers the internal surface of the CF substrate 103.

For instance, as illustrated in FIGS. 2A to 2E, the internal surface of the TFT substrate 102 completely covers the internal surface of the CF substrate 103. FIGS. 2A to 2E are front views of the borderless LCD provided by the embodiment of the present invention.

As illustrated in FIGS. 2A to 2E, the length of four sides of the internal surface of the TFT substrate 102 is equal to or larger than that of corresponding four sides of the internal surface of the CF substrate 103. Detailed description will be given below to several typical conditions in which the length of the four sides of the internal surface of the TFT substrate 102 is equal to or larger than that of the corresponding four sides of the internal surface of the CF substrate 103.

In an example, the length of sides, corresponding to the flexible circuit board connecting area 105, on the internal surface of the TFT substrate 102 is greater than the length of corresponding sides on the internal surface of the CF substrate 103.

Figure 2A:
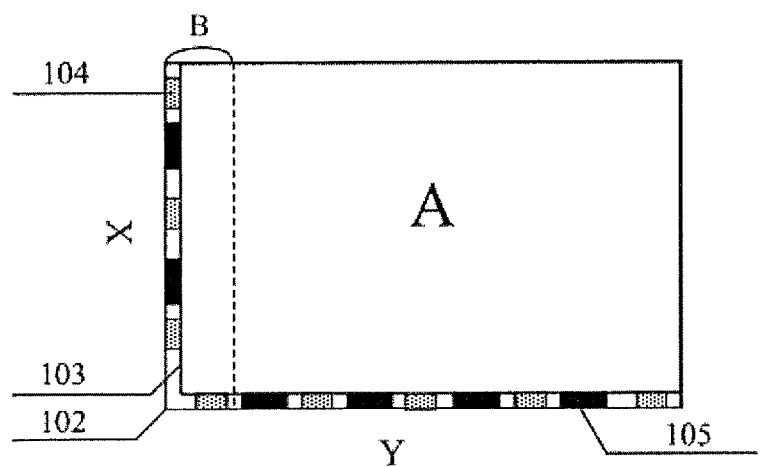
FIGS. 2A to 2E are schematic diagrams illustrating position of an adhesive layer of the LCD in accordance with embodiments of the present invention.

For instance, as illustrated in FIG. 2A, an A area refers to the overlapped area of the internal surface of the TFT substrate 102 and the internal surface of the CF substrate 103. The flexible circuit board connecting area 105 is disposed at an area except the A area on the internal surface of the TFT substrate 102. One part of the flexible circuit board connecting area 105 is disposed between an X side of the TFT substrate 102 and an X side of the CF substrate 103, on the internal surface of the TFT substrate 102; and the other part of the flexible circuit board connecting area 105 is disposed between a Y side of the TFT substrate 102 and a Y side of the CF substrate 103, on the internal surface of the TFT substrate 102.

In an example, the length of an X side, corresponding to the flexible circuit board connecting area 105, on the internal surface of the TFT substrate 102 is greater than the length of a corresponding X side on the internal surface of the CF substrate 103; and the length of a Y side, corresponding to the flexible circuit board connecting area 105, on the internal surface of the TFT substrate 102 is greater than the length of a corresponding Y side on the internal surface of the CF substrate 103.

In an example, the length of sides, except the sides corresponding to the flexible circuit board connecting area 105, on the internal surface of the TFT substrate 102 is also greater than the length of corresponding sides on the internal surface of the CF substrate 103.

Figure 2B:
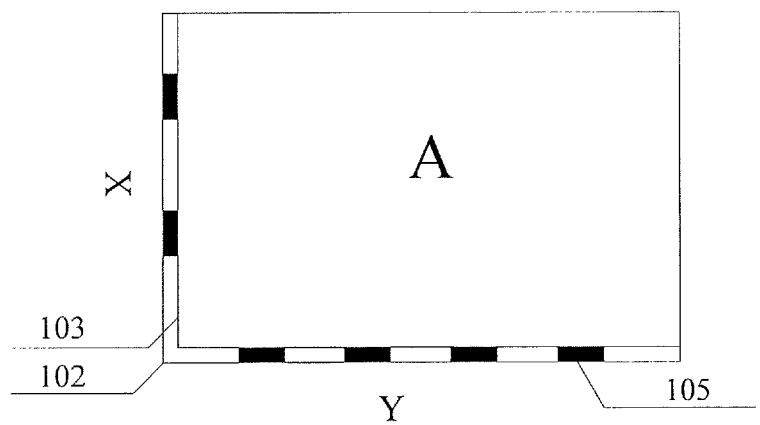
Figure 2C:
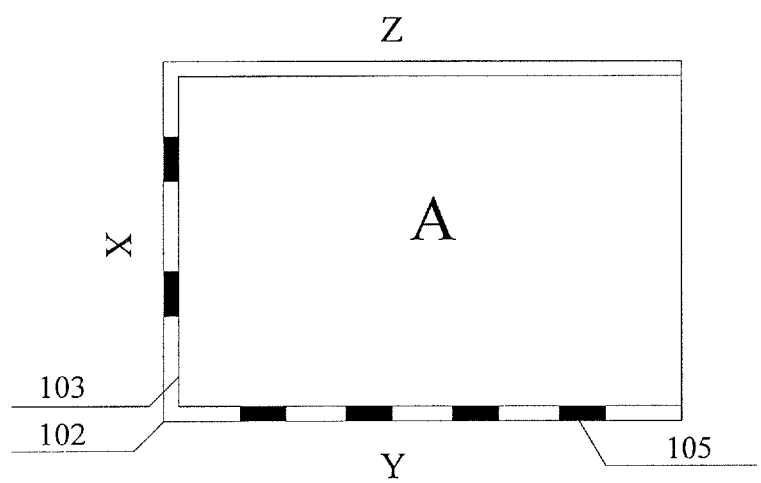
Figure 2D:
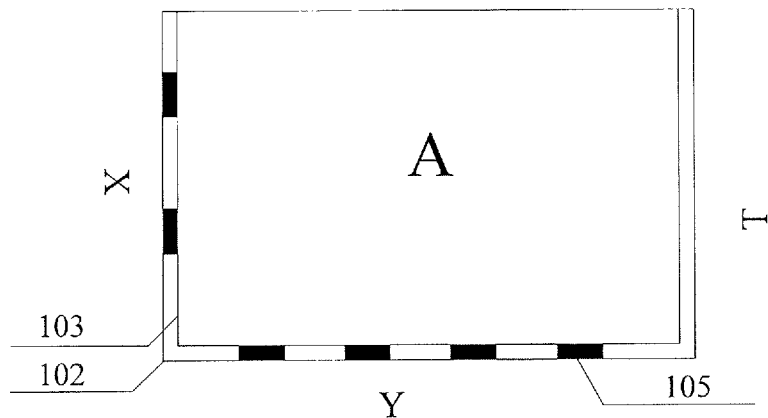

For instance, as illustrated in FIGS. 2C and 2D, an A area refers to the overlapped area of the internal surface of the TFT substrate 102 and the internal surface of the CF substrate 103. The flexible circuit board connecting area 105 is disposed at an area except the A area on the internal surface of the TFT substrate 102. One part of the flexible circuit board connecting area 105 is disposed between an X side of the TFT substrate 102 and an X side of the CF substrate 103, on the internal surface of the TFT substrate 102; and the other part of the flexible circuit board connecting area 105 is disposed between a Y side of the TFT substrate 102 and a Y side of the CF substrate 103, on the internal surface of the TFT substrate 102.

As illustrated in FIG. 2C, the length of a Z side, corresponding to a non-flexible circuit board connecting area 105, on the internal surface of the TFT substrate 102 is greater than the length of a corresponding Z side on the internal surface of the CF substrate 103. As illustrated in FIG. 2D, the length of a T side, corresponding to the non-flexible circuit board connecting area 105, on the internal surface of the TFT substrate 102 is greater than the length of a corresponding T side on the internal surface of the CF substrate 103.

In an example, the length of four sides of the internal surface of the TFT substrate 102 is all greater than the length of corresponding four sides of the internal surface of the CF substrate 103.

Figure 2E:
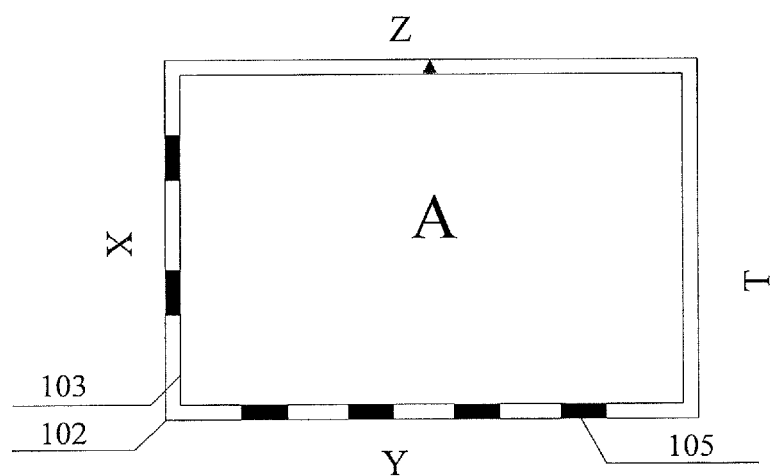

For instance, as illustrated in FIG. 2E, an A area refers to the overlapped area of the internal surface of the TFT substrate 102 and the internal surface of the CF substrate 103. The flexible circuit board connecting area 105 is disposed at an area except the A area on the internal surface of the TFT substrate 102. One part of the flexible circuit board connecting area 105 is disposed between an X side of the TFT substrate 102 and an X side of the CF substrate 103, on the internal surface of the TFT substrate 102; and the other part of the flexible circuit board connecting area 105 is disposed between a Y side of the TFT substrate 102 and a Y side of the CF substrate 103, on the internal surface of the TFT substrate 102.

The length of four sides of the internal surface of the TFT substrate 102 is all greater than the length of corresponding four sides of the internal surface of the CF substrate 103. That is to say, the length of an X side of the internal surface of the TFT substrate 102 is greater than that of a corresponding X side of the internal surface of the CF substrate 103; the length of a Y side of the internal surface of the TFT substrate 102 is greater than that of a corresponding Y side of the internal surface of the CF substrate 103; the length of a Z side of the internal surface of the TFT substrate 102 is greater than that of a corresponding Z side of the internal surface of the CF substrate 103; and the length of a T side of the internal surface of the TFT substrate 102 is greater than that of a corresponding T side of the internal surface of the CF substrate 103.

In the embodiment, as the length of the four sides of the internal surface of the TFT substrate 102 is greater than the length of the corresponding four sides of the internal surface of the CF substrate 103, the position of the adhesive layer 104 is widened, and hence the stability of the borderless LCD is guaranteed.

For instance, the adhesive layer 104 is disposed at partial or entire area except a specific area on the internal surface of the TFT substrate 102. Description will be given below respectively.

In an example, the adhesive layer 104 is disposed at partial area except a specific area on the internal surface of the TFT substrate 102.

For instance, as illustrated in FIG. 2A, an A area refers to the overlapped area of the internal surface of the TFT substrate 102 and the internal surface of the CF substrate 103. One part of the flexible circuit board connecting area 105 is disposed at partial area between an X side of the TFT substrate 102 and an X side of the CF substrate 103, on the internal surface of the TFT substrate 102; and the other part of the flexible circuit board connecting area 105 is disposed at partial area between a Y side of the TFT substrate 102 and a Y side of the CF substrate 103, on the internal surface of the TFT substrate 102. The adhesive layer 104 is disposed at partial area except the specific area on the internal surface of the TFT substrate 102.

In an example, the adhesive layer 104 is disposed at entire area except a specific area on the internal surface of the TFT substrate 102.

For instance, as illustrated in FIG. 2B, an A area refers to the overlapped area of the internal surface of the TFT substrate 102 and the internal surface of the CF substrate 103. One part of the flexible circuit board connecting area 105 is disposed at partial area between an X side of the TFT substrate 102 and an X side of the CF substrate 103, on the internal surface of the TFT substrate 102; and the other part of the flexible circuit board connecting area 105 is disposed at partial area between a Y side of the TFT substrate 102 and a Y side of the CF substrate 103, on the internal surface of the TFT substrate 102. The adhesive layer 104 is disposed at entire area except the specific area on the internal surface of the TFT substrate 102.

In the embodiment, as the adhesive layer 104 is disposed at the entire area except the specific area on the internal surface of the TFT substrate 102, the stability of the borderless LCD is guaranteed.

In an example, a liquid crystal layer is further encapsulated between the TFT substrate 102 and the CF substrate 103, and the TFT substrate 102, the CF substrate 103 and the liquid crystal layer are assembled into a liquid crystal cell.

For instance, as illustrated in FIG. 1, the LCD provided by the embodiment of the present invention further comprises a first polarizer 106 and a second polarizer 107; the first polarizer 106 is disposed on an external surface of the TFT substrate 102; and the second polarizer 107 is disposed on an external surface of the CF substrate 103.

The external surface of the TFT substrate 102 is another surface opposite to the internal surface of the TFT substrate 102; and the external surface of the CF substrate 103 is another surface of the CF substrate 103, opposite to the internal surface of the CF substrate 103.

For instance, the first polarizer 106 is a vertical polarizer and the second polarizer 107 is a horizontal polarizer, or the first polarizer 106 is a horizontal polarizer and the second polarizer 107 is a vertical polarizer.

In the embodiment, as the LCD comprises the first polarizer 106 and the second polarizer 107, the deflection of liquid crystals is controlled by a voltage, and the light transmittance is controlled by the cooperation of the first polarizer 106 and the second polarizer 107, and hence the normal display of the borderless LCD is guaranteed.

Figure 3:
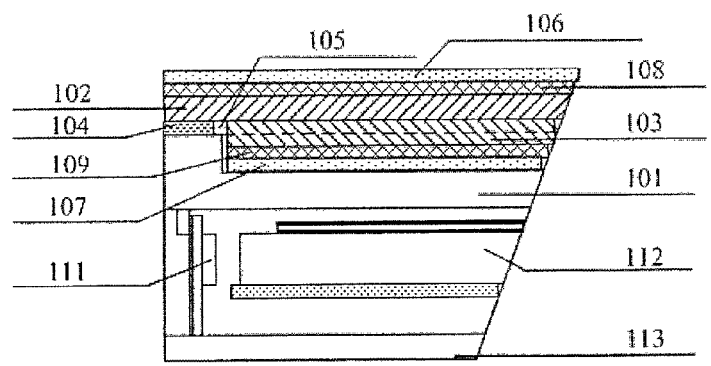
FIG. 3 is a schematic structural partial view of an LCD provided with phase retardation films in accordance with an embodiment of the present invention.

For instance, as illustrated in FIG. 3, the LCD provided by the embodiment of the present invention further comprises a first phase retardation film 108 and a second phase retardation film 109; the first phase retardation film 108 is disposed between the first polarizer 106 and the TFT substrate 102; and the second phase retardation film 109 is disposed between the second polarizer 107 and the CF substrate 103.

In an example, the first phase retardation film 108 and the second phase retardation film 109 achieve opposite phase retardation.

In an example, any first phase retardation film 108 and any second phase retardation film 109 capable of achieving opposite phase retardation are applicable to the embodiment of the present invention.

For instance, the first phase retardation film 108 is a $-\lambda/4$ phase retardation film and the second phase retardation film 109 is a $\lambda/4$ phase retardation film, or the first phase retardation film 108 is a $\lambda/4$ phase retardation film and the second phase retardation film 109 is a $-\lambda/4$ phase retardation film.

It should be noted that FIG. 3 is a partial top view of the borderless LCD provided by the embodiment of the present invention.

In the embodiment, as the LCD comprises the first phase retardation film 108 and the second phase retardation film 109, the borderless LCD is guaranteed to be able to avoid the reflection of incident ambient light.

Description will be given below to the display principle of the LCD provided with the phase retardation films in accordance with the embodiment of the present invention, by taking the case that the first polarizer 106 is a vertical polarizer, the second polarizer 107 being a horizontal polarizer, the first phase retardation film 108 being a $-\lambda/4$ phase retardation film and the second phase retardation film 109 being a $\lambda/4$ phase retardation film as an example. The implementation of other cases is similar to the implementation of the embodiment of the present invention, and no further description will be given here.

Figure 4:
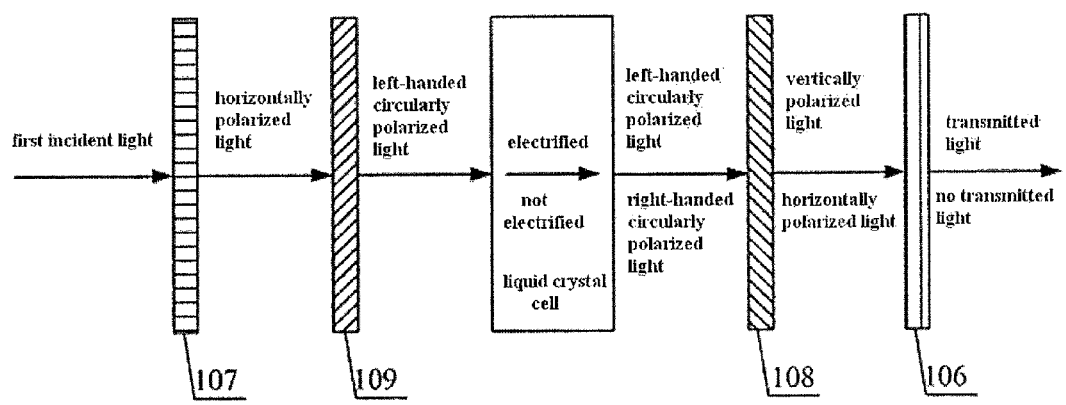
FIG. 4 is a schematic diagram illustrating the display principle of the LCD provided with the phase retardation films in accordance with an embodiment of the present invention.

As illustrated in FIG. 4, a first incident light is converted into horizontally polarized light after running through the second polarizer 107; the horizontally polarized light is converted into left-handed circularly polarized light after running through the second phase retardation film 109; and then the left-handed circularly polarized light runs through the liquid crystal cell.

When the liquid crystal cell is electrified, the left-handed circularly polarized light still has a left-handed circularly polarized light component after running through the liquid crystal cell; then, the left-handed circularly polarized light is converted into vertically polarized light after running through the first phase retardation film 108; the vertically polarized light runs through the first polarizer 106; and hence images can be displayed normally.

When the liquid crystal cell is not electrified, the left-handed circularly polarized light is converted into right-handed circularly polarized light after running through the liquid crystal cell; the right-handed circularly polarized light is converted into horizontally polarized light after running through the first phase retardation film 108; the horizontally polarized light cannot run through the first polarizer 106; and hence the images cannot be displayed.

In an example, the first incident light is light generated by a backlight source.

Description will be given below to the principle of avoiding the reflection of incident ambient light of the LCD provided with the phase retardation films in accordance with the embodiment of the present invention, by taking the case that the first polarizer 106 is a vertical polarizer, the second polarizer 107 being a horizontal polarizer, the first phase retardation film 108 being a $-\lambda/4$ phase retardation film and the second phase retardation film 109 being a $\lambda/4$ phase retardation film as an example. The implementation of other cases is similar to the implementation of the embodiment of the present invention, and no further description will be given here.

Figure 5:
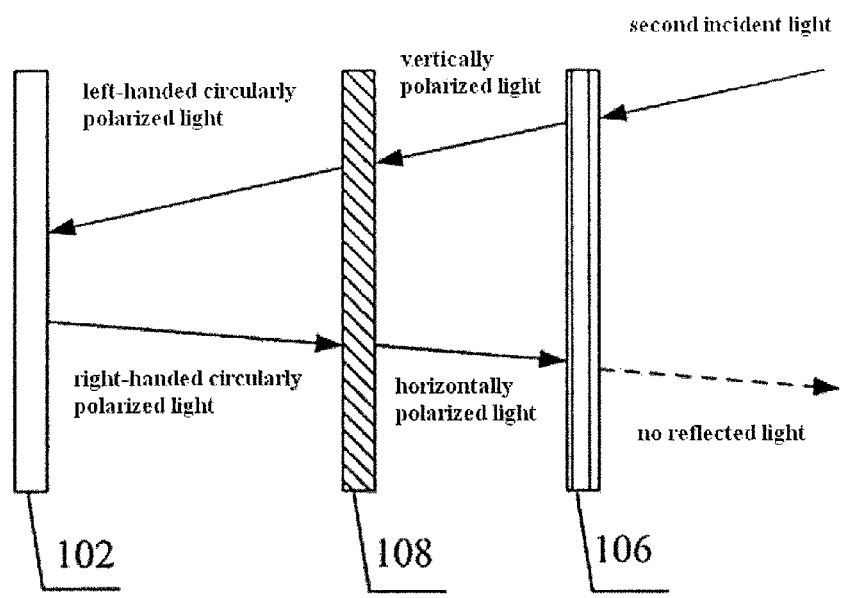
FIG. 5 is a schematic diagram illustrating the principle of avoiding the reflection of incident ambient light of the LCD provided with the phase retardation films in accordance with an embodiment of the present invention.

As illustrated in FIG. 5, second incident light is converted into vertically polarized light after running through the first polarizer 106; the vertically polarized light is converted into left-handed circularly polarized light after running through the first phase retardation film 108; the left-handed circularly polarized light is converted into right-handed circularly polarized light after being reflected by a structure, e.g., an electrode, on the TFT substrate 102; the right-handed circularly polarized light is converted into horizontally polarized light after running through the first phase retardation film 108; the horizontally polarized light cannot run through the vertical polarizer; and hence the LCD provided with the phase retardation films in accordance with the embodiment of the present invention can avoid the reflection of incident ambient light.

As an example, the second incident light is ambient light.

For instance, a black light-shielding layer is disposed on the TFT substrate of the LCD provided by the embodiment of the present invention and configured to avoid the reflection of incident ambient light. The black light-shielding layer is disposed at a non-display area and disposed at peripheral areas of pixels in a display area on the internal surface of the TFT substrate.

For instance, the black light-shielding layer is a black resin layer.

Description will be given below to the display principle when the TFT substrate 102 of the LCD provided by the embodiment of the present invention comprises the black light-shielding layer, by taking the case that the first polarizer 106 is a vertical polarizer and the second polarizer 107 is a horizontal polarizer as an example. The implementation of other cases is similar to the implementation of the embodiment of the present invention, and no further description will be given here.

Figure 6:
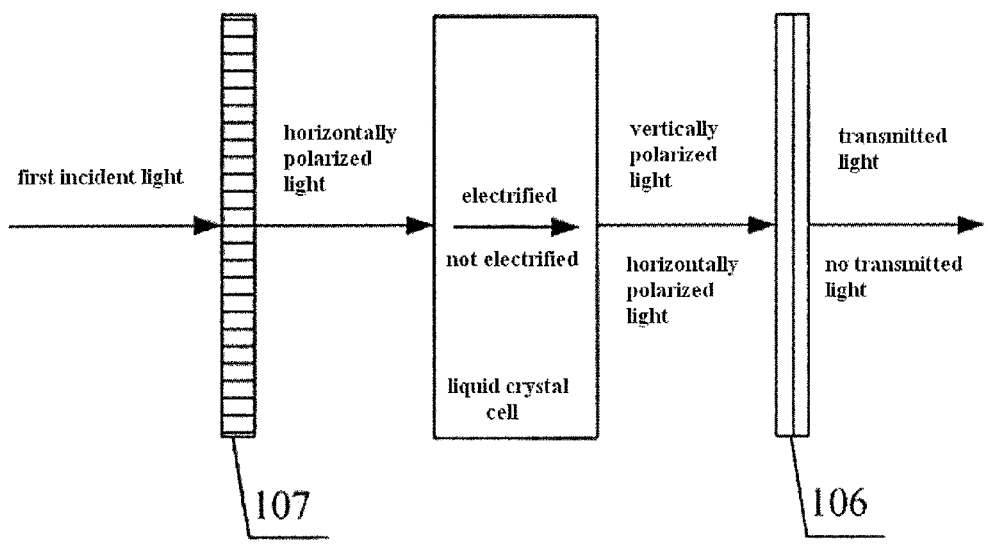
FIG. 6 is a schematic diagram illustrating the display principle of an LCD provided by an embodiment of the present invention, in which a TFT substrate is provided with a black light-shielding layer.

As illustrated in FIG. 6, first incident light is converted into horizontally polarized light after running through the second polarizer 107, and then the horizontally polarized light runs through the liquid crystal cell.

When the liquid crystal cell is electrified, the horizontally polarized light is converted into vertically polarized light after running through the liquid crystal cell; the vertically polarized light can run through the first polarizer 106; and hence the images can be displayed normally.

When the liquid crystal cell is not electrified, the horizontally polarized light is still horizontally polarized light after running through the liquid crystal cell; the horizontally polarized light cannot run through the first polarizer 106; and hence the images cannot be displayed.

In an example, the first incident light is light generated by a backlight source.

Description will be given below to the principle of avoiding the reflection of incident ambient light when the TFT substrate 102 of the LCD provided by the embodiment of the present invention comprises the black light-shielding layer, by taking the case that the first polarizer 106 is a vertical polarizer and the second polarizer 107 is a horizontal polarizer as an example. The implementation of other cases is similar to the implementation of the embodiment of the present invention, and no further description will be given here.

Figure 7:
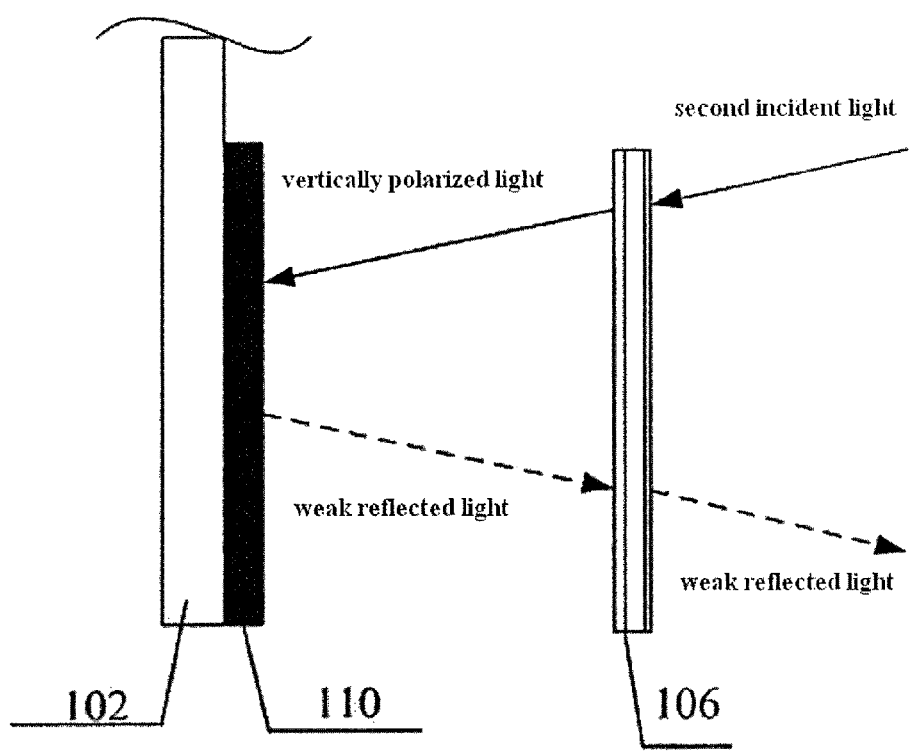
FIG. 7 is a schematic diagram illustrating the principle of avoiding the reflection of ambient light of the LCD in accordance with an embodiment of the present invention, in which the TFT substrate is provided with the black light-shielding layer.

As illustrated in FIG. 7, second incident light is converted into vertically polarized light after running through the first polarizer 106, and then the vertically polarized light is incident on the TFT substrate 102. As the TFT substrate 102 comprises the black light-shielding layer 110 which absorbs most light, light obtained after the reflection of the second incident light is quite weak, and hence the LCD provided by the embodiment of the present invention, in which the TFT substrate 102 comprises the black light-shielding layer 110, can avoid the reflection of incident ambient light.

In an example, the second incident light is ambient light.

For instance, as illustrated in FIGS. 1 and 3, a frame 101 is disposed at an area, except the overlapped area of the internal surface of the TFT substrate 102 and the internal surface of the CF substrate 103, on the internal surface of the TFT substrate 102 and a peripheral area on the second polarizer 107, and configured to support the TFT substrate 102 and fix the CF substrate 103 and structures, e.g., the second polarizer 107, disposed thereon between the TFT substrate 102 and the frame 101.

In an example, the area, except the overlapped area of the internal surface of the TFT substrate 102 and the internal surface of the CF substrate 103, on the internal surface of the TFT substrate 102 is an area, except an area directly facing to the internal surface of the CF substrate 103, on the internal surface of the TFT substrate 102.

In an example, the frame 101 is disposed at partial or entire area of the peripheral area on the second polarizer 107, for instance, disposed on two sides, three sides, four sides or four corners of the peripheral area of the second polarizer 107. No limitation will be given here in the present invention, as long as the frame can stably support the CF substrate so that the CF substrate can be tightly assembled with the TFT substrate.

For instance, supposing FIG. 2A is a front view of the borderless LCD and FIG. 1 is a top view of a B part of the borderless LCD. As illustrated in FIG. 1, one part of the frame 101 is disposed at an area between an X side of the TFT substrate 102 and an X side of the CF substrate 103, on the internal surface of the TFT substrate 102; one part of the frame 101 is disposed at an area between a Y side of the TFT substrate 102 and a Y side of the CF substrate 103, on the internal surface of the TFT substrate 102 (a part shielded by the CF substrate 103 and the second polarizer 107 is represented by dotted lines in FIG. 1); and the remaining frame 101 is disposed at the peripheral area on the second polarizer 107.

In the embodiment, as the frame 101 is disposed at the area except the overlapped area of the internal surface of the TFT substrate 102 and the internal surface of the CF substrate 103 and disposed at the peripheral area on the second polarizer 107, higher stability of the borderless LCD is guaranteed.

In an example, the LCD provided by the embodiment of the present invention further comprises a light source: a light-emitting diode (LED) 111, an optical film layer 112 and a back plate 113. The connection relations among the LED 111, the optical film layer 112 and the back plate 113 in the LCD provided by the embodiment of the present invention are similar to the connection relations among an LED, an optical film layer and a back plate in a known LCD. In an example, the figures illustrate the connection relations by taking an edge-lighting light source as an example. The optical film layer may comprise structures such as a light guide plate, a diffusion film, a prism film and a reflector plate; the light source and the reflector plate are disposed on the back plate 113; the light guide plate and other optical films are disposed on the reflector plate; and the light source is disposed on one side of the light guide plate in the optical film. As for a bottom-lighting light source, the optical film layer may comprise structures such as a diffusion plate, a diffusion film, a prism film and a reflector plate; the light source is disposed on the back plate 113; and the optical film layer is disposed on the light source. Moreover, the flexible circuit board connected to the TFT substrate gets around the back of the light source through a flexible flat cable and is disposed on the back plate, and hence the borderless design of the LCD can be further achieved.

For instance, the embodiment of the present invention provides an electronic device, which comprises the foregoing LCD.

In an example, the electronic device provided by the embodiment of the present invention may be any electronic device with the LCD, e.g., a desktop computer and a calculator.

Although the embodiments of the present invention have been described, other changes and modifications may be made to the embodiments once those skilled in the art learn the basic creative concept. Therefore, the appended claims are intended to comprise the preferred embodiments and all the changes and modifications falling within the scope of the present invention.

Obviously, various modifications and deformations can be made to the present invention by those skilled in the art without departing from the spirit and scope of the present invention. Therefore, if the modifications and deformations of the present invention fall within the scope of the appended claims of the present invention and equivalents thereof, the present invention is also intended to comprise the modifications and deformations.

The invention claimed is:

1. A liquid crystal display (LCD), comprising:
   a position limiting structure,
   a thin-film transistor (TFT) substrate,
   a color filter (CF) substrate adhered to an internal surface of the TFT substrate, and
   an adhesive layer disposed at partial or entire area of the internal surface of the TFT substrate except a specific area on the internal surface of the TFT substrate, the TFT substrate fixed to the position limiting structure through the adhesive layer,
   wherein an internal surface of the CF substrate is adhered to the internal surface of the TFT substrate; and the specific area on the internal surface of the TFT substrate comprises an overlapped area of the internal surface of the TFT substrate and the internal surface of the CF substrate and an area, for connecting a flexible circuit board, on the internal surface of the TFT substrate;
   wherein a part of the area for connecting the flexible circuit board is disposed at partial area between an X side of the TFT substrate and an X side of the CF substrate, on the internal surface of the TFT substrate; and the other part of the flexible circuit board is disposed at partial area between a Y side of the TFT substrate and a Y side of the CF substrate, on the internal surface of the TFT substrate.

2. The LCD according to claim 1, further comprising a first polarizer and a second polarizer; the first polarizer is disposed on an external surface of the TFT substrate; the second polarizer is disposed on an external surface of the CF substrate;
   wherein the first polarizer is a vertical polarizer and the second polarizer is a horizontal polarizer, or the first polarizer is a horizontal polarizer and the second polarizer is a vertical polarizer; the external surface of the TFT substrate is another surface opposite to the internal surface of the TFT substrate, and the external surface of the CF substrate is another surface of the CF substrate, opposite to the internal surface of the CF substrate.

3. The LCD according to claim 2, further comprising a first phase retardation film and a second phase retardation film; the first phase retardation film is disposed between the first polarizer and the TFT substrate; the second phase retardation film is disposed between the second polarizer and the CF substrate;

wherein the first phase retardation film and the second phase retardation film achieve opposite phase retardation.

4. The LCD according to claim 3, wherein the first phase retardation film is a $-\lambda/4$ phase retardation film and the second phase retardation film is a $\lambda/4$ phase retardation film, or the first phase retardation film is a $\lambda/4$ phase retardation film and the second phase retardation film is a $-\lambda/4$ phase retardation film.

5. The LCD according to claim 1, wherein a black light-shielding layer is further disposed on the TFT substrate and configured to avoid reflection of incident ambient light.

6. The LCD according to claim 5, wherein the black light-shielding layer is a black resin layer.

7. The LCD according to claim 2, wherein the position limiting structure is disposed at an area, except the overlapped area of the internal surface of the TFT substrate and the internal surface of the CF substrate, on the internal surface of the TFT substrate and at partial peripheral area on the second polarizer, and configured to support the TFT substrate and fix the CF substrate between the TFT substrate and the position limiting structure.

8. The LCD according to claim 1, wherein the internal surface of the TFT substrate covers whole of the internal surface of the CF substrate.

9. The LCD according to claim 1, further comprising a light source and an optical film which are fixed on the position limiting structure.

10. An electronic device, comprising the LCD according to claim 1.

11. The electronic device according to claim 10, comprising:

a position limiting structure, a thin-film transistor (TFT) substrate, a color filter (CF) substrate adhered to an internal surface of the TFT substrate, and an adhesive layer disposed at partial or entire area except a specific area on the internal surface of the TFT substrate, the TFT substrate fixed to the position limiting structure through the adhesive layer, wherein an internal surface of the CF substrate is adhered to the internal surface of the TFT substrate; and the specific area on the internal surface of the TFT substrate comprises an overlapped area of the internal surface of the TFT substrate and the internal surface of the CF substrate and an area, for connecting a flexible circuit board, on the internal surface of the TFT substrate.

12. The electronic device according to claim 11, further comprising a first polarizer and a second polarizer; the first polarizer is disposed on an external surface of the TFT substrate; the second polarizer is disposed on an external surface of the CF substrate;

wherein the first polarizer is a vertical polarizer and the second polarizer is a horizontal polarizer, or the first polarizer is a horizontal polarizer and the second polarizer is a vertical polarizer; the external surface of the TFT substrate is another surface opposite to the internal surface of the TFT substrate, and the external surface of the CF substrate is another surface of the CF substrate, opposite to the internal surface of the CF substrate.

13. The electronic device according to claim 12, further comprising a first phase retardation film and a second phase retardation film; the first phase retardation film is disposed between the first polarizer and the TFT substrate; the second phase retardation film is disposed between the second polarizer and the CF substrate;

wherein the first phase retardation film and the second phase retardation film achieve opposite phase retardation.

14. The electronic device according to claim 13, wherein the first phase retardation film is a $-\lambda/4$ phase retardation film and the second phase retardation film is a $\lambda/4$ phase retardation film, or the first phase retardation film is a $\lambda/4$ phase retardation film and the second phase retardation film is a $-\lambda/4$ phase retardation film.

15. The electronic device according to claim 11, wherein a black light-shielding layer is further disposed on the TFT substrate and configured to avoid reflection of incident ambient light.

16. The electronic device according to claim 15, wherein the black light-shielding layer is a black resin layer.

17. The electronic device according to claim 12, wherein the position limiting structure is disposed at an area, except the overlapped area of the internal surface of the TFT substrate and the internal surface of the CF substrate, on the internal surface of the TFT substrate and at partial or entire peripheral area on the second polarizer, and configured to support the TFT substrate and fix the CF substrate between the TFT substrate and the position limiting structure.

18. The electronic device according to claim 11, wherein the internal surface of the TFT substrate covers whole of the internal surface of the CF substrate.

19. The electronic device according to claim 11, further comprising a light source and an optical film which are fixed on the position limiting structure.

* * * * *